Oct. 15, 1968   C. GEHENOT   3,406,022
PROCESS AND INSTALLATION FOR GLASS TEMPERING AND COOLING
Filed June 10, 1965   2 Sheets-Sheet 1

Inventor
Charles Gehenot
Stevens, Davis, Miller & Mosher
Attorneys 3,406,022
PROCESS AND INSTALLATION FOR GLASS
TEMPERING AND COOLING
Charles Gehenot, Brussels, Belgium, assignor to "Compagnie belgo-luxembourgeoise du Commerce exterieur," in abridgment: "Cobelcomex," Brussels, Belgium, a company of Belgium
Filed June 10, 1965, Ser. No. 462,921
Claims priority, application Luxembourg, June 12, 1964, 46,312
11 Claims. (Cl. 65—114)

ABSTRACT OF THE DISCLOSURE

Glass is preheated in a preheating tunnel to a temperature sufficient to permit high frequency dielectric heating, and the preheated glass is introduced into a room in which the preheated glass is further heated by high frequency dielectric heating means, followed by cooling without movement of the glass to effect tempering.

---

This invention relates to improvements to processes for tempering and cooling sheet glass, convex glass, hollow glass, glass tubes and the like.

It is well known that tempering of glass comprises two distinct operations: first glass is heated up to a precise temperature and then it is very rapidly cooled down to a temperature below the lower limit of the tempering heating range.

In the processes now used, heating of glass is carried out by radiation. Radiation-producing apparatus are generally nappe-arranged electrical resistors so that radiation uniformly acts on the whole area of the glass to be heated.

A process was also proposed, wherein glass heating is made by forced convection, air of the kiln being continuously stirred up by means of suitable devices.

It has also been proposed to heat glass by dielectric heating but this process, particularly because of the low heating efficiency, has not been commercially used in the tempering process. The radiation heating process has however some drawbacks the most important of which is due to the fact that this process does not give a quite uniform heating, at the same time along the inside and outside surfaces of said glass. If glass has to be tempered, it results that temper is not uniform and also very often glass breaks up during transfer and tempering. This breakage of glass adversely influences the economics of the process.

This invention has for its object to remedy these drawbacks. To this end, in the process of the invention, glass sustained by means of a moving device, after having passed through a tunnel where the glass is continuously preheated to the final preheating temperature, is brought into a room where it is first raised to the tempering temperature, then rapidly cooled in the same room, down to a temperature below the lower limit of tempering heating range.

When employing dielectric heating, which is a voltage rather than a current effect, heat is generated uniformly throughout the volume of the work. The usual explanation of the theory of dielectric heating is that the continued rapid application of alternating stresses, usually applied by a high frequency generator, causes a phenomenon similar to frictional stresses between the atoms of the dielectric material thereby generating heat. Because the electric field creating the stress is uniform throughout the thickness of the dielectric material, the heating is likewise very nearly uniform throughout. The amount of heat generated in the dielectric material varies with a number of factors including the frequency and the so-called angle of loss or angle of dielectric loss. Referring to the following vector diagram found in Encyclopedie Quillet, page 483, the angle of loss refers to the angle δ between P$r$ (reactance power) and P (power). In said diagram P$a$ refers to the actual quantity of energy absorbed in the dielectric material in the form of heat, and U refers to the alternating tension.

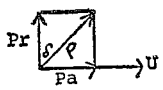

It is apparent that when the angle δ is small, P$a$ is similarly small and little heat is absorbed by the dielectric material. In general, it may be said that said angle increases with temperature.

According to a preferred embodiment of the invention, glass after continuous preheating in the tunnel where it is raised to such a temperature that its angle of dielectrical losses is high, is conveyed into a room where the glass is heated to the tempering temperature by means of a high frequency dielectric heating, and then the glass is subjected in the same room to a rapid cooling by means of a fluid under pressure.

Another object of this invention is to provide an installation for carrying out the above-described process.

Generally speaking, such an installation comprises a tunnel wherein glass mounted on a moving device is continuously heated to the final preheating temperature, and a room, distinct from the tunnel and in which means for dielectrically heating glass to its tempering temperature are provided, as well as cooling means for bringing the glass to a temperature lower than the lower limit of tempering. The final heating of glass up to the tempering temperature and cooling takes place in said room.

According to a particular embodiment, the room comprises electrodes for high frequency dielectric heating, which are distributed in a plane or surface able to ensure a uniform heating up to the tempering temperature, and means producing jets of a fluid under pressure and also distributed in a plane or surface able to ensure an uniform cooling in the same room.

Other details and particularities of the process and installation of the present invention will become apparent from the description of the annexed drawings which show by way of nonlimitative examples several particular embodiments of an installation according to the invention.

In various figures, the same reference numerals refer to analogous elements.

Figure 1:
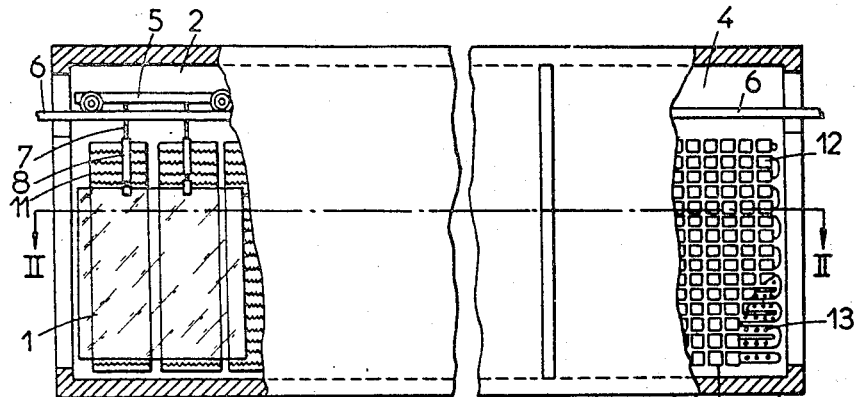
FIG. 1 is a partly broken away elevation view of a tempering installation according to the invention.
Figure 2:
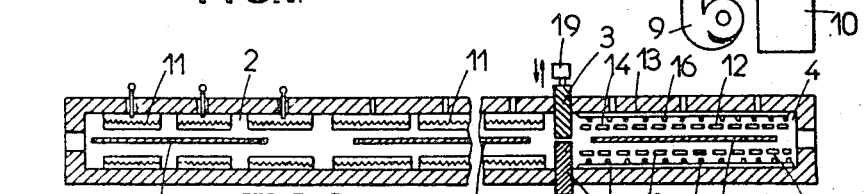
FIG. 2 is a cross-sectional view along plane II—II of FIG. 1.
Figure 3:
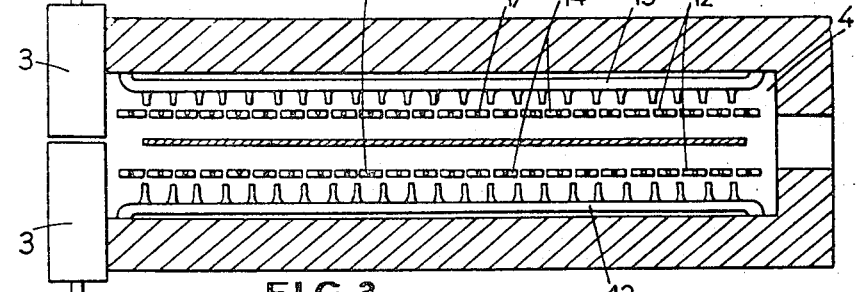
FIG. 3 is a partial view showing the position of pivoting electrodes during heating, said view being taken along plane II—II of FIG. 1.
Figure 4:
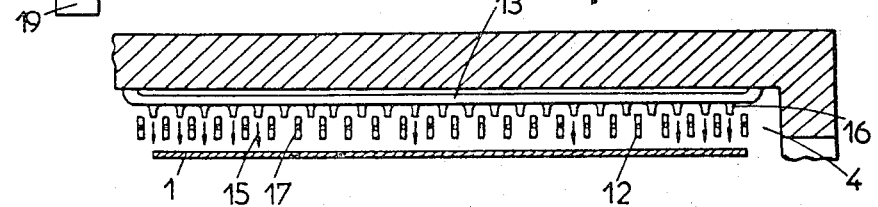
FIG. 4 is a partial view of a portion of the apparatus shown in FIG. 3, showing position of pivoting electrodes during cooling.

The installation shown by the drawings is intended to be used for tempering sheet glass 1. Said installation comprises a continuous preheating tunnel 2 and a heating room 4. In the particular embodiment shown by the drawings, tunnel 2 and room 4 are in line so as to ensure a fabrication in a continuous line. The transfer is made by means of a carriage 5 moving on rails 6, glass 1 hangs from the carriage 5 by means of cables 7 provided with clamps 8. The installation is also provided with a fan 9 and a high frequency generator 10.

The preheating tunnel 2 comprises known heating means, consisting in the present case of electrical resistors 11 (other means may obviously be provided) to heat the glass 1 in said tunnel 2 by radiation. The temperature curve to be obtained in said tunnel 2 will continuously raise until a temperature in the range of 400 to 500° C. for example. Consequently, during the whole operation of preheating, the radiation losses towards the external ambient medium are at a minimum, which thus ensures a high preheating yield.

According to the invention, glass 1 from the tunnel is at such a temperature that its angle of dielectrical losses is high enough so that the high frequency dielectric heating is possible.

When the temperature of glass 1 has reached the suitable level, it is transferred through retractable doors 3 into the heating room 4 where it is heated to the tempering temperature, i.e. a temperature of about 650° C. Doors 3 move apart under the action of piston mechanisms 19 or other devices, so as to allow glass to pass into the room 4, and then close again so as to isolate the room 4 from the preheating tunnel 2. The heating room 4 comprises, according to a preferred embodiment of the invention, electrodes 12 for high frequency dielectric heating and the cooling device 13.

Electrodes 12 are connected to the high frequency generator 10 only when a sheet of glass 1 is in place. Consequently, power consumption is reduced to a minimum.

Tempering takes place immediately after heating, glass 1 remaining in place in the room 4. The process of the invention has thus very important advantages as compared with the processes now used because the glass at a heated tempering temperature is not moved so that the risk of incipient fractures is eliminated. The instant invention also eliminates special cooling room; rapid and critical transfer means from heating room 4 to cooling room; and finally radiation and convection losses from room 4 towards external ambient medium when glass passes, said losses due to the tempering temperature being particularly high in existing installations. Furthermore, in the latter, the temperature drop at the exit of the heating oven resulted in a nonuniform temperature gradient in said oven which needed a long period of time to be brought again to the necessary precise and uniform temperature. The continuous process of the invention reduces said reheating period by several minutes, thus reducing power consumption and allowing a larger rate of production for installations having same sizes.

Tempered glass is cooled in room 4 down to a temperature lower than the lower limit of tempering, for example 300–400° C. The removal of glass from heating room 4 is accompanied by only a low temperature drop in said room, temperature remaining therein about the same as that of the preheating tunnel. Glass may thus be immediately replaced by another glass 1 to be tempered, the temperature of said new glass being immediately uniformly elevated by dielectric heating.

Electrodes 12 form at both sides of glass 1 a continuous surface 14 which takes the shape of the latter. Eventually said electrodes may be placed against the glass surface. Heating of glass 1 is thus obtained evenly on the whole surface thereof, as well as inside said glass.

Cooling is obtained according to known processes by means of jets 15 of a fluid under pressure, for example air, contacting both faces of the glass from a plurality of nozzles 16 forming part of the cooling device 13.

In the preferred embodiment shown by FIGS. 1 to 4, each electrode 12 is mounted on an axle 17 and may pivot by 90° with respect to its normal position, so that, at the time of tempering, a free passage is allowed to jets 15 of cooling fluid or to nozzles which would be moved towards the glass by means of a mechanical device.

Figure 5:
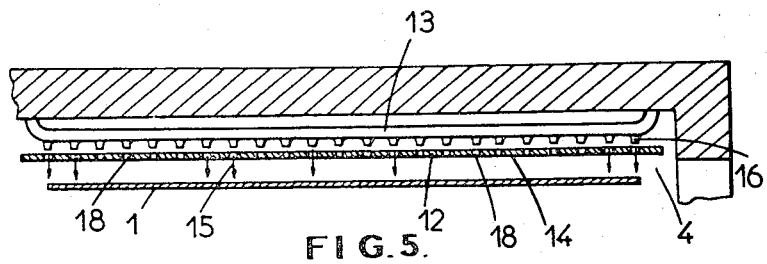
FIG. 5 is a partial view of a portion of the apparatus shown in FIG. 3, showing the particular embodiment with non-pivoting electrodes.

According to another embodiment shown in FIG. 5, electrodes 12 are maintained in the plane of surfaces 14 formed by said electrodes. In this embodiment, surfaces 14 are provided with a plurality of holes 18 distributed on the whole area and each arranged in front of a nozzle 16, so that the jets 15 pass through said holes 18. Preferably, electrodes 12 and nozzles 16 are moved with a regular gyratory movement in the planes of surfaces 14 which movement has such an amplitude that each point of glass 1 is evenly heated and then evenly cooled.

Figure 6:
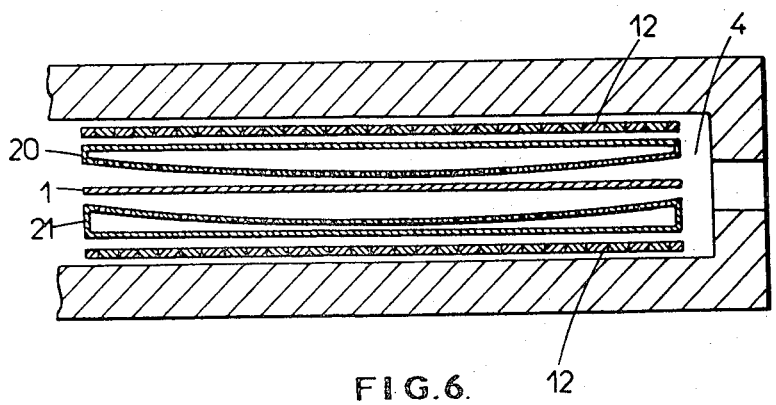
FIG. 6 is a partial view of another embodiment according to the invention, wherein the cooling device is movable.

In the embodiment of FIG. 6, it has been supposed that electrodes 12, after heating of glass 1, have moved apart from the latter to give place to a tempering cooling device represented here by two boxes 20 and 21 which come between electrodes 12 and glass 1 so as to cool the latter. It is contemplated that, as in FIG. 6, these boxes 20 and 21 may form at the same time a cooling system and a system to make glass convex. In the case of said FIG. 6, any known cooling system may obviously be used after the electrodes are moved apart.

It is to be understood that the invention is in no way limited to the embodiments described and that many changes may be brought therein without departing from the scope of the invention.

I claim:

1. A process for tempering glass comprising preheating glass in a tunnel to a final preheating temperature, said final preheating temperature being a temperature at which subsequent dielectric heating of the glass is feasible, conveying the preheated glass into a room, heating the glass in said room by high frequency dielectric heating to a tempering temperature, and upon termination of the heating step rapidly cooling said glass in said room to a temperature below the lower limit of the tempering range.

2. A process according to claim 1, wherein said cooling is carried out by means of a fluid under pressure.

3. Apparatus for tempering glass which comprises a preheating tunnel, means to heat said glass within said tunnel to a temperature at which the glass has a high angle of dielectric loss and subsequent dielectric heating of the glass is feasible, a heating room distinct from said tunnel, means to convey preheated glass from said tunnel to said room, high frequency dielectric heating means in said room to heat preheated glass to its tempering temperature, and cooling means within said room to cool said glass to a temperature lower than the lower limit of the tempering temperature range.

4. Apparatus according to claim 3, further comprising doors separating said preheating tunnel from said heating room.

5. Apparatus according to claim 3, wherein said high frequency dielectric heating means comprise a plurality of electrodes disposed to ensure a uniform heating of the glass, and said cooling means comprise a plurality of jets distributed to ensure a uniform cooling of said glass.

6. Apparatus according to claim 5, wherein said electrodes are positioned between the glass to be heated and said cooling means, said electrodes being positioned to provide passages for jets of fluid under pressure therethrough at the time of cooling.

7. Apparatus according to claim 5, wherein said electrodes are disposed between the glass to be heated and said jets, and further comprising means pivotally mounting said electrodes to enable said electrodes to be pivoted towards and away from positions substantially blocking the flow of cooling fluid from said jets towards the glass.

8. Apparatus according to claim 6, wherein said electrodes are provided with a plurality of holes distributed over the entire area thereof to allow passage of jets of fluid under pressure at the time of cooling.

9. Apparatus according to claim 3, in which said cooling means include a plurality of orientable nozzles movable towards said glass.

10. Apparatus according to claim 9, in which said heating means comprise a plurality of electrodes, and further comprising means enabling said electrodes to be moved away from the glass.

11. Apparatus according to claim 6, further comprising means to move said electrodes and said cooling means in a gyratory movement.

References Cited

UNITED STATES PATENTS

| 2,145,119 | 1/1939 | Littleton | 65—116 |
| 2,178,520 | 10/1939 | Howard | 65—115 |
| 2,188,401 | 1/1940 | Crowley | 65—348 X |
| 2,194,760 | 3/1940 | Long | 65—349 |
| 2,199,511 | 5/1940 | Perry et al. | 65—114 |

DONALL H. SYLVESTER, Primary Examiner.

ARTHUR D. KELLOGG, Assistant Examiner.